(12) United States Patent
Klein et al.

(10) Patent No.: US 9,094,827 B1
(45) Date of Patent: Jul. 28, 2015

(54) SYSTEMS AND METHODS FOR AUTHENTICATING MOBILE DEVICES AT AN INCIDENT VIA COLLABORATION

(71) Applicant: MOTOROLA SOLUTIONS, INC, Schaumburg, IL (US)

(72) Inventors: David E. Klein, Davie, FL (US); Alejandro G. Blanco, Fort Lauderdale, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 14/602,595

(22) Filed: Jan. 22, 2015

Related U.S. Application Data

(62) Division of application No. 13/517,703, filed on Jun. 14, 2012, now Pat. No. 8,971,850.

(51) Int. Cl.
*H04M 11/04* (2006.01)
*H04W 12/06* (2009.01)
*H04W 4/22* (2009.01)
*H04W 88/06* (2009.01)

(52) U.S. Cl.
CPC .............. *H04W 12/06* (2013.01); *H04W 4/22* (2013.01); *H04W 88/06* (2013.01)

(58) Field of Classification Search
None
See application file for complete search history.

(56) References Cited

U.S. PATENT DOCUMENTS 8,280,364 B1 * 10/2012 Sennett et al. .............. 455/419

* cited by examiner

*Primary Examiner* — Suhail Khan
(74) *Attorney, Agent, or Firm* — Steven A. May

(57) ABSTRACT

A mobile device collaboration method includes provisioning a first mobile device with unique user identification related to a role and skill set of an associated user of the first mobile device, detecting a second mobile device responsive to a condition at the first mobile device, communicating the unique user identification to the second mobile device, authenticating the first mobile device through the second mobile device communicating the unique user identification to an external database, and providing access for the first mobile device through the second mobile device if the authenticating is successful. A mobile device collaboration system and a mobile device are also described.

6 Claims, 12 Drawing Sheets

SYSTEMS AND METHODS FOR AUTHENTICATING MOBILE DEVICES AT AN INCIDENT VIA COLLABORATION

CROSS-REFERENCE TO RELATED APPLICATION

The present application is a divisional application of, and claims priority to, U.S. patent application Ser. No. 13/517,703, filed in the United States Patent Office on Jun. 14, 2012, the entire contents of which are incorporated herein by reference.

FIELD OF THE DISCLOSURE

The present disclosure relates generally to wireless communications and more particularly to systems and methods for authenticating mobile devices at an incident via collaboration and for finding non-public safety personnel who meet certain criteria at the incident.

BACKGROUND

Wireless communication systems and methods are ubiquitous. In general, devices such as mobile devices are configured to operate on wireless networks. Wireless networks can be generally classified as public networks or private networks. Exemplary public wireless networks include broadband networks, cellular networks, Wireless Local Area Networks (WLANs), etc. Generally, the public wireless networks include the networks that offer smart phone, tablet, cell phone, etc. subscriber connectivity. Private networks, on the other hand, can include Land Mobile Radio (LMR) and other mission critical networks. Further, wireless networks have defined wireless coverage, and wireless devices outside of such wireless coverage cannot communicate. Due to different wireless coverage of public and private networks, a user of one type of network such as a broadband user on a public network could be at a scene of an incident without wireless coverage. Assume further that there is a private network accessible by one or more users at the incident. Conventionally, the broadband user without coverage would not have network access while the private network users would. Further, the broadband user could have an urgent need for network access due to the incident such as the broadband user being a doctor, emergency medical technician, or other type of critical personnel. Accordingly, there is a need for a systems and methods for authenticating mobile devices at an incident allowing the broadband user network access via collaboration and finding non-public safety personnel who meet certain criteria in the area.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
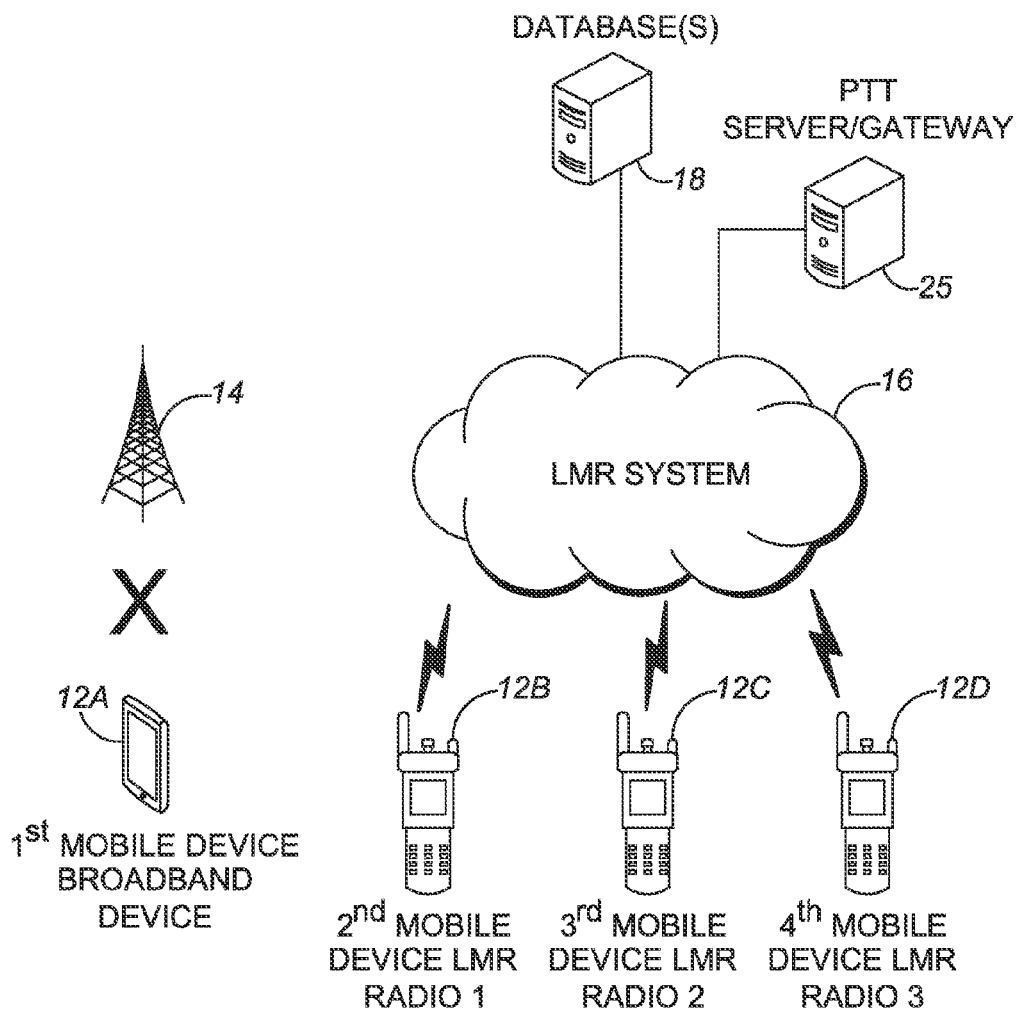
FIG. 1 is a network diagram of a mobile device collaboration system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an exemplary embodiment, a mobile device collaboration method includes provisioning a first mobile device with unique user identification related to a role and skill set of an associated user of the first mobile device, detecting a second mobile device responsive to a condition at the first mobile device, communicating the unique user identification to the second mobile device, authenticating the first mobile device through the second mobile device communicating the unique user identification to an external database, and providing access for the first mobile device through the second mobile device if the authenticating is successful.

In another exemplary embodiment, a mobile device collaboration system includes a first mobile device utilizing a first wireless network, a second mobile device utilizing a second wireless network, an external database communicatively coupled to the second mobile device, wherein the first mobile device includes software including instructions executable by the first mobile device and, in response to such execution, cause the first mobile device to: store unique user identification related to a role and skill set of an associated user of the first mobile device, detect the second mobile device responsive to an inability to connect to the first wireless network, communicate the unique user identification to the second mobile device, and establish a collaborative connection with the second mobile device responsive to the second mobile device successfully verifying the first mobile device using the unique user identification and the external database.

In yet another exemplary embodiment, a mobile device includes a first radio configured to operate on a broadband wireless network, a second radio configured to operate a personal area network, a processor communicatively coupled to the first radio and the second radio, and software stored in memory and including instructions executable by the processor and, in response to such execution, cause the processor to: store unique user identification related to a role and skill set of an associated user of the mobile device, detect a second mobile device responsive to an inability to connect to the broadband wireless network, communicate the unique user identification to the second mobile device, and establish a collaborative connection with the second mobile device responsive to the second mobile device successfully verifying the mobile device using the unique user identification and the external database.

Figure 2:
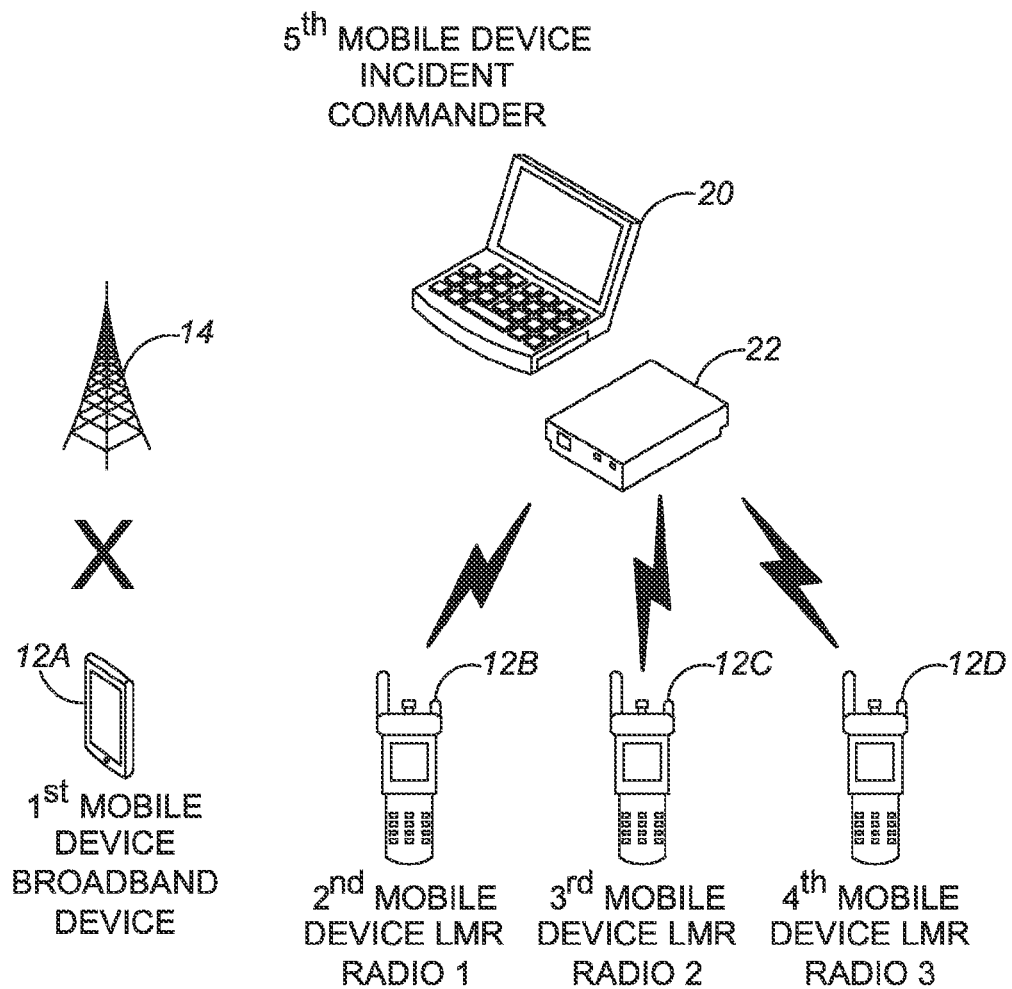
FIG. 2 is a network diagram of another mobile device collaboration system in accordance with some embodiments.

Referring to FIGS. 1 and 2, in an exemplary embodiment, a network diagram illustrates a mobile device collaboration system 10. The system 10 includes a broadband device 12A and LMR devices 12B, 12C, 12D. Each of the devices 12A, 12B, 12C, 13D is a mobile device such as the mobile device 12 depicted in FIG. 11. The system 10 provides systems and methods for collaboration between the devices 12A, 12B, 12C, 12D. The broadband device 12A can be referred to as a first mobile device that is configured to communicate on a network 14. For example, the network 14 can be a 3G network, 4G network, Long Term Evolution (LTE) network, Wireless Local Area Network (WLAN) network such as IEEE 802.11 and variations thereof, WiMAX such as IEEE 802.16 and variations thereof, and the like. In an exemplary embodiment, the network 14 can be a public network. In the context of the mobile device collaboration system 10, the broadband device 12A is unable to communicate on the network 14 at the scene of an incident. However, the system 10 also includes the devices 12B, 12C, 12D at the incident as well. The devices 12B, 12C, 12D can be referred to as second, third, and fourth mobile devices that are configured to communicate on a network 16. For example, the network 16 can be an LMR system or the like. In an exemplary embodiment, the network 16 can be a private network. Note, in these examples, LMR and broadband are used as exemplary systems, and those of ordinary skill in the art will recognize other types of systems are also contemplated herein.

Generally, the mobile device collaboration system 10 contemplates users of the devices 12A, 12B, 12C, 12D, etc. from different networks sharing resources via ad hoc linking there between. As described herein, one context of the system 10 can be on scene of an incident with the users being public safety members. For example, assume the devices 12B, 12C, 12D are associated with public safety users, and assume the network 16 is a mission critical network. In an exemplary embodiment, a user of the device 12A can be a non-public safety member, non-active public safety member, etc. However, the user of the device 12A can be someone whose presence is needed or required at the incident such as, for example, a doctor, paramedic, or someone else involved in the incident. The assumption is the user of device 12A does not have connectivity to the network 14, but requires network connectivity in context of the incident such as, for example, to communicate with a hospital. In an exemplary embodiment, the user of device 12A is an identifiable individual through a database 18, an incident commander 20 connected to a base station 22, or the like. In the system 10, the devices 12B, 12C, 12D are configured to implement a sharing procedure with the device 12A and to use information to identify the user of the device 12A, such as through the database, the incident commander 20, etc., and to provide network access. In an exemplary embodiment, the system 10 can also include a PTT server/gateway 25 for PTT hosting. Note, this functionality can also be in the LMR system 16.

The broadband device 12A can be preconfigured by the user, an administrator, etc. to contain identification data associated with the user's role. Further, this information can be contained in the database, with the incident commander 20, etc. For example, the user could be a doctor, paramedic, firefighter, a National Guard member, a member of the military, or other Federal/State/local public safety member. Generally, the user of the device 12A can be anyone that 1) is identifiable through the database 18, the incident commander 20, etc., 2) is not configured to communicate on the network 16, 3) is configured to communicate via ad hoc connections, and 4) needs but does not have network connectivity at the incident. Thus, the user of the device 12 wants to be authorized to be part of the system 10 on scene to talk directly with law enforcement or other public safety agents, but is out of coverage or in a poor coverage zone on the network 14 such as due to lack of coverage or natural/man-made disaster, and the user need access to private system resources such as through the devices 12B, 12C, 12D. For example, the user of the device 12A may need access for voice or non-voice applications in conjunction with the incident.

In operation of the system 10, the broadband device 12A is configured to connect with one of the devices 12B, 12C, 12D. That is, a public network device such as the device 12A is configured to connect to a public safety based LMR device (or combination LMR/broadband, etc.). This connection is used for authenticating the device 12A and for network access by the device 12A. The connection can be via near field pairing, wireless local area network (WLAN) advertising, or Bluetooth sniffing for special purpose devices. Further, the device 12A and/or the devices 12B, 12C, 12D can include an application that is preloaded thereon. Coordination between the devices 12A and the devices 12B, 12C, 12D can utilize existing protocols, techniques, and methods. The application is merely a special purpose application to support this identification sharing operation, authentication, and ad hoc communication.

For example, assume the device 12A is going to collaborate with an LMR subscriber using the device 12B. The LMR subscriber with the device 12B and the device 12A arbitrate the connection and the device 12B accesses identification details of the user of the device 12A. Once this arbitration is complete, the device 12B can validate and authenticate the credentials/identity of the user of the device 12A with a nation/state/local database (e.g., NPR doctor ID national database for example). Once validated and the device 12B accepts the credentials, the broadband device 12A can have access to appropriate system resources. These system resources can be managed as local operation only, LMR system/talkgroup limited operation, or full operation including data throughput access. If the system resources are utilized via an LMR proxy, it can be done as the primary or secondary user of those resources. If using the LMR device 12B as a proxy (perhaps the broadband device 12A is connected to a "donor" radio) the LMR device 12B can share talkgroup details or local tactical channel information to the broadband device 12A device to operate similar to a traditional LMR device. If the sharing of resources is more about granting access, the LMR device 12B (or dispatch center via the incident commander 20) can grant limited (time, data throughput, etc) access to the broadband device 12A on a private Public Safety BB system, e.g. the network 16. This approach allows the user of the device 12A who is not authorized to be on the network 16 to leverage an LMR solution via an ad hoc local network to get access to these limited resources under the supervision/authorization of a local on scene authorized LMR user.

The mobile device collaboration system 10 leverages the fact that smartphone and general smart device usage is ever increasing. That is, public network providers offer smartphone, tablet, hotspot, etc. connectivity using 4G data rates. As these devices proliferate, it is expected that there will be significant presence of such devices and their associated users at incidents. Without network connectivity, these associated users cannot communicate. As major incidents continue to occur, the public service response can be hampered by lack of resources. In an exemplary embodiment, an objective of the system 10 is ease of identification of support resources as well as providing a mechanism for them to communicate over the network 16 despite being configured to communicate on the network 14. In an exemplary embodiment, the system 10 includes the application on the device 12A and/or the devices 12B, 12C, 12D. On the device 12A, the application is configured for common smart phone platforms to share credentials that allow the users of the devices 12B, 12C, 12D working the incident to verify the user of the device 12A's credentials.

The ability to identify someone's skill sets better allow the public service personnel on scene to engage assistance as soon as possible. Additional verification of identity allows them to utilize standard practices on how much access a given person (i.e., based on their role) should have on the system 10. The system 10 is a solution that leverages the LMR pipeline (or private broadband) for non-authorized users while showing an end-to-end solution linking back to verification databases in the back office (e.g., federal, state or local based). For example, about 80% of firefighters are volunteer and this is an easy and cost effective way for them to identify themselves in a reliable manner. That is, the system 10 leverages the assumption that most users carry a smart phone or device. The addition of the application enables various exemplary functionality described herein. This concept can be extended to military people. More smart phones are being deployed and this is a way to a soldier to be added into an ad hoc network on the battlefield in a simple manner with back end verification. If no backend is possible, this solution can also be used for simple resource management when people come onto a fire scene. Their smart phones link in and are logged. But instead of using them in the fire, they are handed a radio that they can then preprogram with their user information. In the future, when bio monitoring information is captured in the data, the user can then re-synch after the incident to keep track of their own health and safety information.

Figure 3:
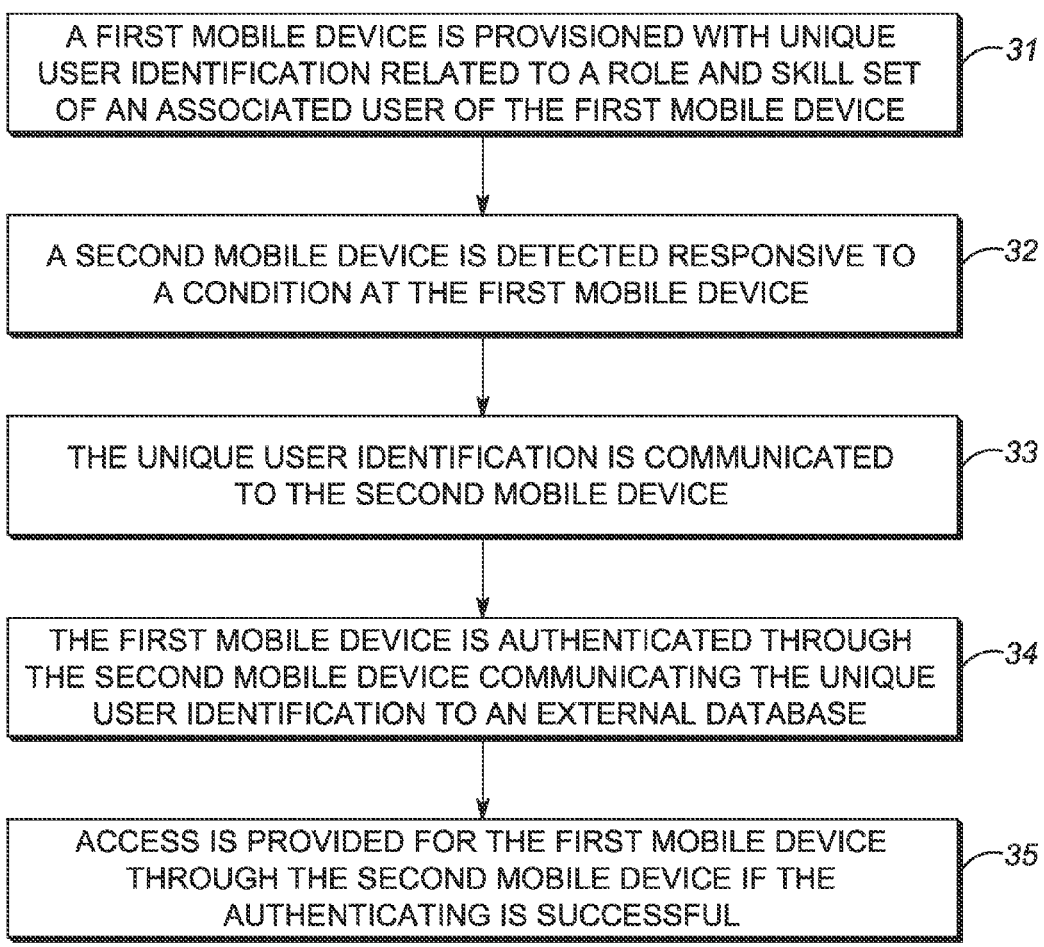
FIG. 3 is a flowchart of a mobile device collaboration method in accordance with some embodiments.

Referring to FIG. 3, in an exemplary embodiment, a flowchart illustrates a mobile device collaboration method 30. The method 30 can be implemented in the system 10, and the method 30 includes a first mobile device, a second mobile device, and a database. For example, the first mobile device can be the broadband device 12A, the second mobile device can be any of the devices 12B, 12C, 12D, and the database can be the database 18, the incident commander 20, or the like. Generally, the method 30 enables devices with different users on different networks to establish peer-to-peer connections (e.g., via WLAN, Bluetooth, etc.) allowing the first user to have network access through the second user. The first mobile device is provisioned with unique user identification related to a role and skill set of an associated user of the first mobile device (step 31). The unique user identification can serve two purposes, for example, including authentication/authorization and on-scene notification. First, disparate devices can share the unique user identification for authentication/authorization to verify who the first user is and that the first user needs connectivity via a peer-to-peer connection.

The unique user identification can include any information that can be used to uniquely identify the user of the first device such as, for example, name, an identification number, a Media Access Control (MAC) address, name and role, etc. This information may be in the database 18 with additional information. For example, the unique user identification can uniquely identify the user and can be used in a database look up to find that user's role and/or skill set. The unique user identification can be input into the application on the first device. Also, the first device can have a setup procedure, such as through a graphical user interface, for inputting the unique user identification. In addition to being used for authorization/authentication, another feature can be to use the unique user identification to identify individuals on scene at the incident. This can be useful if a certain skill set is needed, e.g. medical, and on scene personnel can detect this through the advertisements of the unique user identification.

In an exemplary embodiment, the unique user identification can be conveyed between the first device and the second device use PAN techniques, e.g. beacons, etc. The PAN technology can include, for example, WiFi, WLAN, Bluetooth, Wireless Universal Serial Bus (USB), Ultra Wide Band, and the like. In various exemplary embodiments described herein, the PAN technology is illustrated as WiFi (or WLAN or any IEEE 802.11 variant), and those of ordinary skill in the art will recognize any type of PAN technology or equivalent is contemplated for the ad hoc communication systems and methods. Specifically, the first mobile device and the second mobile device each are configured to connect to public or private networks, such as using 3G, 4G, LTE, WiMAX, LMR, or any other protocol. Of note, most mobile devices are equipped with secondary wireless protocols such as the PAN technologies. The systems and methods described herein leverage this to use the PAN technology for access in an ad-hoc or peer-to-peer connection when the primary network is unavailable.

The second mobile device is detected responsive to a condition at the first mobile device (step 32). The condition can include a lack of wireless coverage at the first mobile device, unreliable wireless coverage at the first mobile device, inability to get adequate bandwidth, etc. The second mobile device is configured to advertise its presence to the first mobile device via PAN techniques for possible peer-to-peer collaboration. The first mobile device is configured to look for such advertisements responsive to the condition. For example, the second device can be an LMR device with proxy capabilities enabled and advertising such capabilities (e.g., via WLAN Service Set Identification (SSID) advertising). The first device, e.g. a broadband device, can see this advertised information before connecting to the LMR radio with the best uplink and/or collaborative Radio Frequency (RF) signal (if included in advertised info). In response to detecting the second mobile device, the unique user identification is communicated to the second mobile device (step 33). For example, the first device advertises the unique user identification to the second mobile device using a PAN technique.

The first mobile device is authenticated through the second mobile device communicating the unique user identification to an external database (step 34). This is performed upon the second mobile device receiving the unique user identification. The second mobile device can also include an application or other configuration details enabling the second mobile device to understand the unique user identification for purposes of a peer-to-peer collaboration session. The second mobile device uses an external authorization process taking the unique user identification and processing it against stored methods for that particular type of identification data. For example, the second mobile device is configured to receive a plurality of different types of unique user identification such as names, identification numbers, roles, departments, MAC addresses, etc. The unique user identification could say "John Doe, doctor," "Jane Doe, paramedic," "Jack Doe, FEMA responder," etc. That is, the unique user identification can point the second device to an appropriate database for the external database.

In an exemplary embodiment, the second device can utilize a two factor (or greater) authentication to external databases for verification of the user. For example, the verification can include the unique user identification, direct visual verification by a user of the second mobile device, look up information from the unique user identification, etc. In the case of visual verification, the user of the second mobile device would have to affirmatively authorize the first user. For example, the second user, via the application, could be presented with a audible and/or vibration plus an on-screen notification. The look up of information can come from any number of databases that the second device can access for confirmation.

If the authenticating is successful, access is provided for the first mobile device through the second mobile device (step 35). That is, upon success of the authentication/authorization, the first mobile device can have an active peer-to-peer connection such as via a PAN technique with the second mobile device. The first mobile device can utilize this connection for network access using the second mobile device as a proxy. Once authorized, the devices can exchange application access level policy from the second mobile device's viewpoint (i.e., the second mobile device can be viewed as a master). For example, assume the first mobile device is a broadband device and the second mobile device is an LMR device. The broadband device now can utilize the LMR device as a proxy for allowed features (e.g., a push-to-talk (PTT) operation). The LMR device forwards PTT calls to/from the broadband device as defined by agreed upon application access level policy. If the LMR device assigns the broadband device a lower priority, it would be broker the proxying with the broadband device.

In some exemplary embodiments, it can be assumed the broadband device would not be on the same channel/Talkgroup as LMR device. That is, typically LMR device belong to public safety users and it is assumed the broadband device belongs to non-public safety users. For example, the LMR devices belong to first responders whereas the broadband device belongs to a doctor and the doctor would need to communicate with a hospital or other rescue services and not public safety elements. However, using the systems and methods described herein, the doctor can gain network access as well as notify the public safety users of the doctor's presence. The specific base protocol of peer-to-peer PTT interworking can vary (e.g., Open Mobile Alliance (OMA) Push-to-Talk over Cellular (PoC), ISSI, or other broadband PTT protocols).

Figure 4:
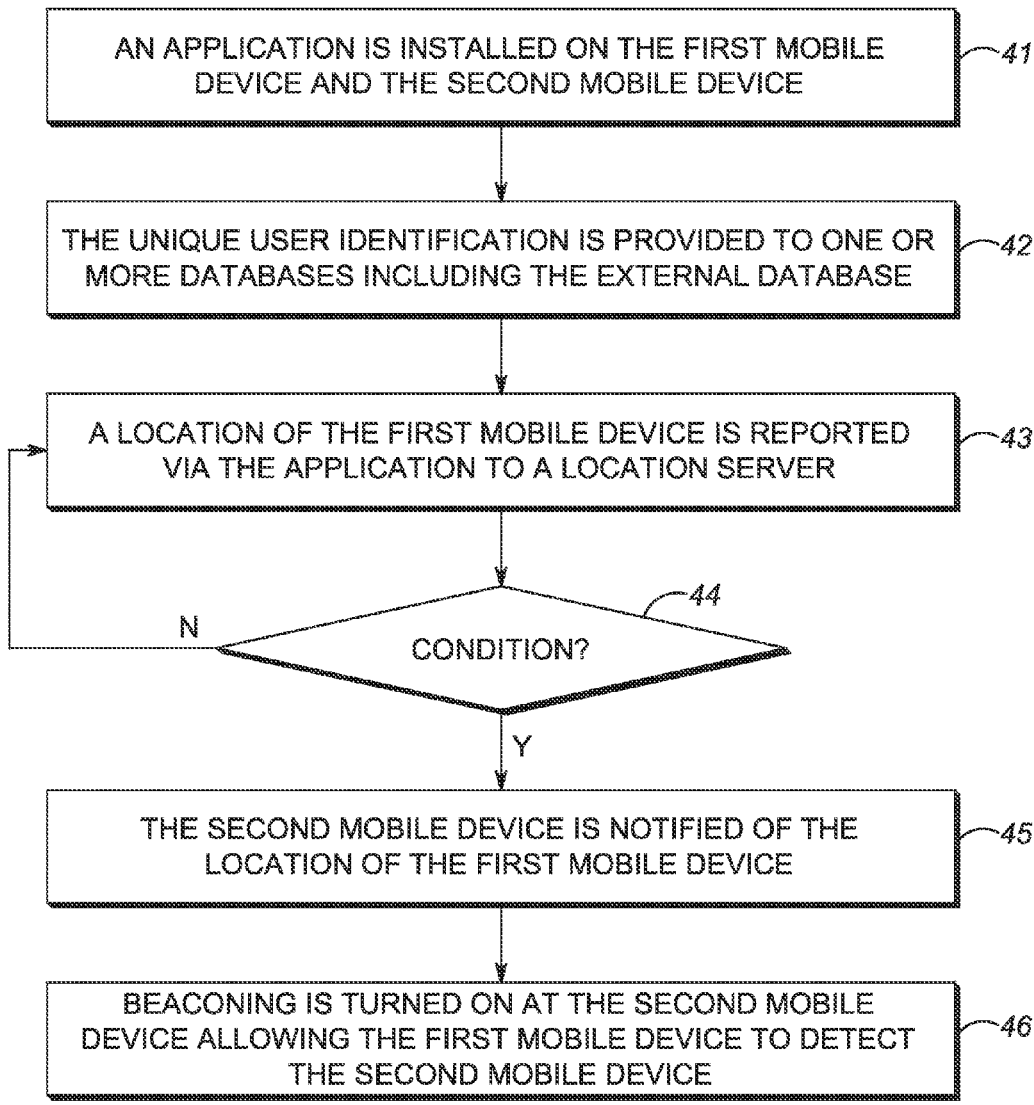
FIG. 4 is a flowchart of a mobile device application method in accordance with some embodiments.

Referring to FIG. 4, in an exemplary embodiment, a flowchart illustrates a mobile device application method 40. The method 40 can be implemented in the system 10, and the method 40 includes a first mobile device, a second mobile device, a database, and a location server. For example, the first mobile device can be the broadband device 12A, the second mobile device can be any of the devices 12B, 12C, 12D, and the database can be the database 18, the incident commander 20, or the like. Generally, the method 40 enables devices with different users on different networks to establish peer-to-peer connections through use of an application, location information, beaconing, etc. First, an application is installed on the first mobile device and the second mobile device (step 41). The application can be the same or different between the first mobile device and the second mobile device. Generally, the application is configured to implement the various methods described herein. That is, the application can control the various functionality on the first mobile device and the second mobile device.

For the first mobile device, the application is configured to enable the first mobile device to contain and advertise the unique user identification, to enable the first mobile device to look for a peer device including the second mobile device when there is lack of wireless coverage, etc. For the second mobile device, the application is configured to enable the second mobile device to advertise its presence or to communicate with a location server, to receive the unique user identification, to authorize/authenticate the unique user identification with the external database, etc. The application can be installed on the first and second mobile device using various methods including being pre-installed, being downloaded from an external site, being integrated within an operating system and settings of the device, being installed via a cable connected to a server, etc.

The unique user identification is provided to one or more databases including the external database (step 42). As described herein, the unique user identification enables identification of the user of the first mobile device as well as providing a method communicating to the external database for authorizing/authenticating. There can be multiple different databases and these databases can already exist for other purposes. For example, the databases can include the National Plan & Provider Enumeration System Database or Registries (available online at nppes.cms.hhs.gov/NPPES/NPIRegistryHome.do), a Paramedic/EMT Registry Database (available online at nremt.org/nremt/about/researchPresentations.asp), etc. FEMA or other officiating agencies can supply database, etc. In general, the second mobile device via the application will receive the unique user identification, parse this information, and determine which database to use from the one or more databases.

A location of the first mobile device is reported via the application to a location server (step 43). In an exemplary embodiment, the first mobile device can periodically upload its position/location to the location server. This location server can also be in communication with the second mobile device (or any other mobile device including devices proximate to the first mobile device). If the first mobile device loses coverage (step 44), the second mobile device is notified of the location of the first mobile device (step 45). Note, the second mobile device can also periodically upload its position/location to the location server. Thus, the location server can know that both the first and second mobile devices are at the incident, and determine based on a lack of updates from the first mobile device that the first mobile device has the condition.

Beaconing is turned on at the second mobile device allowing the first mobile device to detect the second mobile device (step 46). In this exemplary embodiment, the second mobile device only provides the PAN advertisements responsive to the location server thereby limiting draining of the battery with constant beaconing and limiting the potential for outsiders to intercept the beaconing. Here, the application, on both the first and second mobile devices, is configured to period report the locations such as to a UNS service. The triggering event (step 44) can be lack of coverage by the first device, but could also be an affirmative request from the first device. This request or detection that the first mobile device has not checked in goes through the location server. The location server will also know nearby users through the application reporting location, and the location server can notify these users (e.g., the devices 12B, 12C, 12D in FIGS. 1-2) that there is a need for collaboration as well as providing location information and possibly the unique user identification. The application can use mapping and location services to direct the nearby users, and can also provide information on any relevant conditions the user may need to be aware of. If the second mobile device accepts the request from the location server, unique security keys can be sent to both devices (if possible to communicate to the first device), and the PAN/WLAN beaconing can begin. Once in range, local communication can start.

Figure 5:
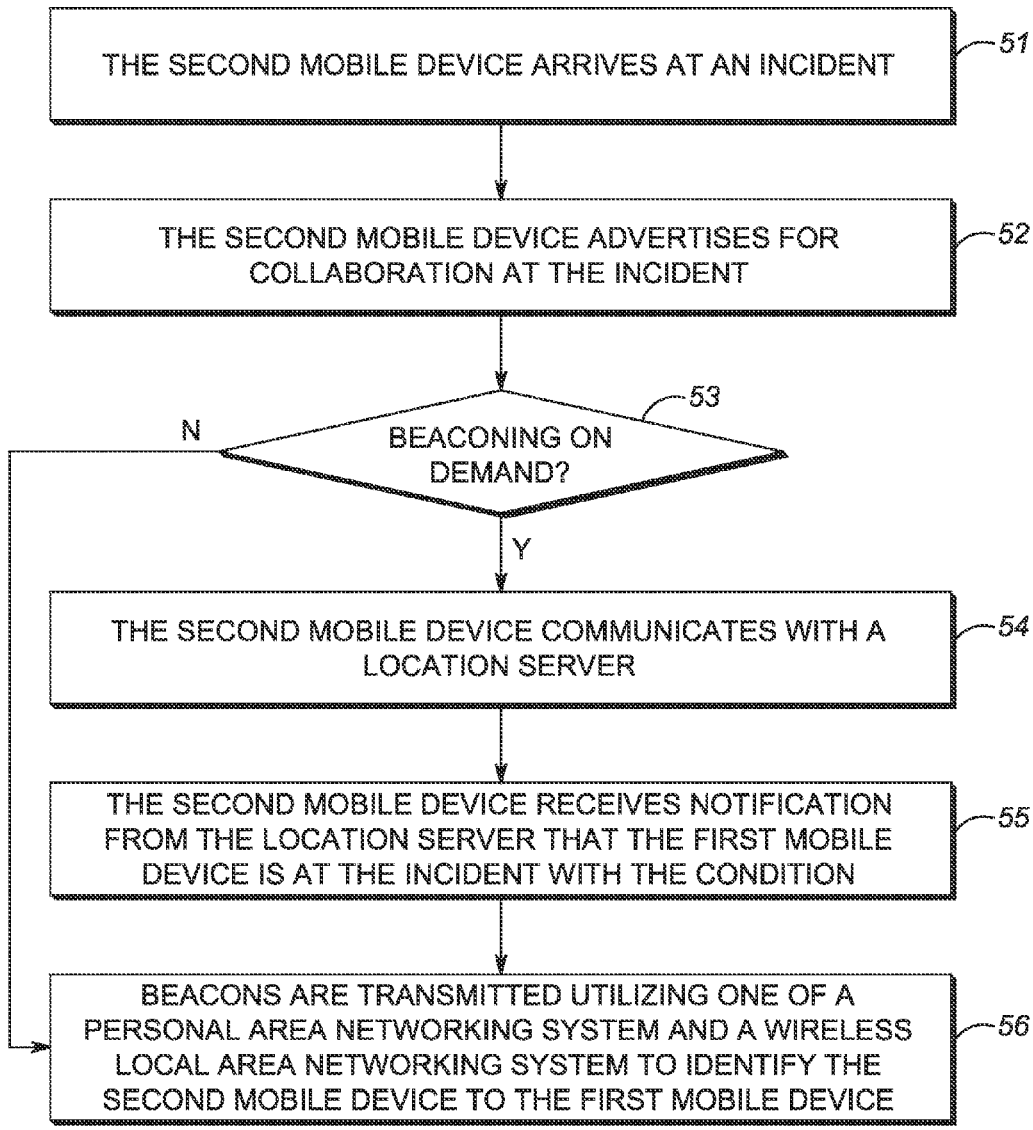
FIG. 5 is a flowchart of a second mobile device beaconing method in accordance with some embodiments.

Referring to FIG. 5, in an exemplary embodiment, a flowchart illustrates a second mobile device beaconing method 50. The method 50 can be implemented in the system 10, and the method 50 includes the second mobile device (e.g., any of the devices 12B, 12C, 12D in FIGS. 1-2) and the location server. Generally, the method 50 enables the second device to collaborate at an incident with the first mobile device through use of the application, location information, beaconing, etc. The second mobile device arrives at an incident (step 51). As described herein, the second device includes the application which allows for advertisement. That is, the second device advertises for collaboration at the incident (step 52). The collaboration can include allowing the first mobile device an ad hoc or peer-to-peer connection for providing network connectivity to the first mobile device. The collaboration can also include taking role of the personnel present at the scene of the incident. For example, the second mobile device can request the unique user identification for all proximate in range users (e.g., devices with the appropriate application/configuration). This could be useful in determining roles and skills on personnel on scene.

The beaconing from the second mobile device can be on demand or continuous (step 53). Continuous beaconing can be turned on/off, but generally operates continuously akin to an Access Point. For the on demand beaconing, the second device communicates with the location server (step 54). The second device receives notification from the location server that the first mobile device is at the incident with the condition (step 55). Alternatively, the location server can simply instruct the second mobile device to turn on beaconing for any reason. Beacons are transmitted utilizing one of a PAN or WLAN system to identify the second mobile device to the first mobile device (step 56). If the beaconing is continuous (step 53), then the method 50 proceeds directly to step 56.

The beacons are used by the second mobile device to alert the first mobile device (and any other devices) of the presence of the second mobile device for collaboration. In an exemplary embodiment, the beacon can be a LMR collaborative link beacon. In another exemplary embodiment, the beacon can be a WLAN beacon. The WLAN beacon can include the advertisements in Vendor-Specific tags thereby preserving the IEEE 802.11 standard and treating the second mobile device like an Access Point. In yet another exemplary embodiment, the beacon can be a proprietary wireless beacon solely used in the system 10 between the devices 12 for the purposes of advertising system attributes to proximate peers, i.e. something proprietary to the application, for example. In Ultra Wide Band, system attributes can be advertised using a private reservation process used to include vendor specific data during broadcasts. In wireless USB, beaconing can be accomplished via the vendor specific Base Class FFh reserved for inclusion of specific vendor data without violation of the standard. The advertisements could also extend to newly developed PAN technologies as well as near-me area network (NAN) concepts being developed.

Figure 6:
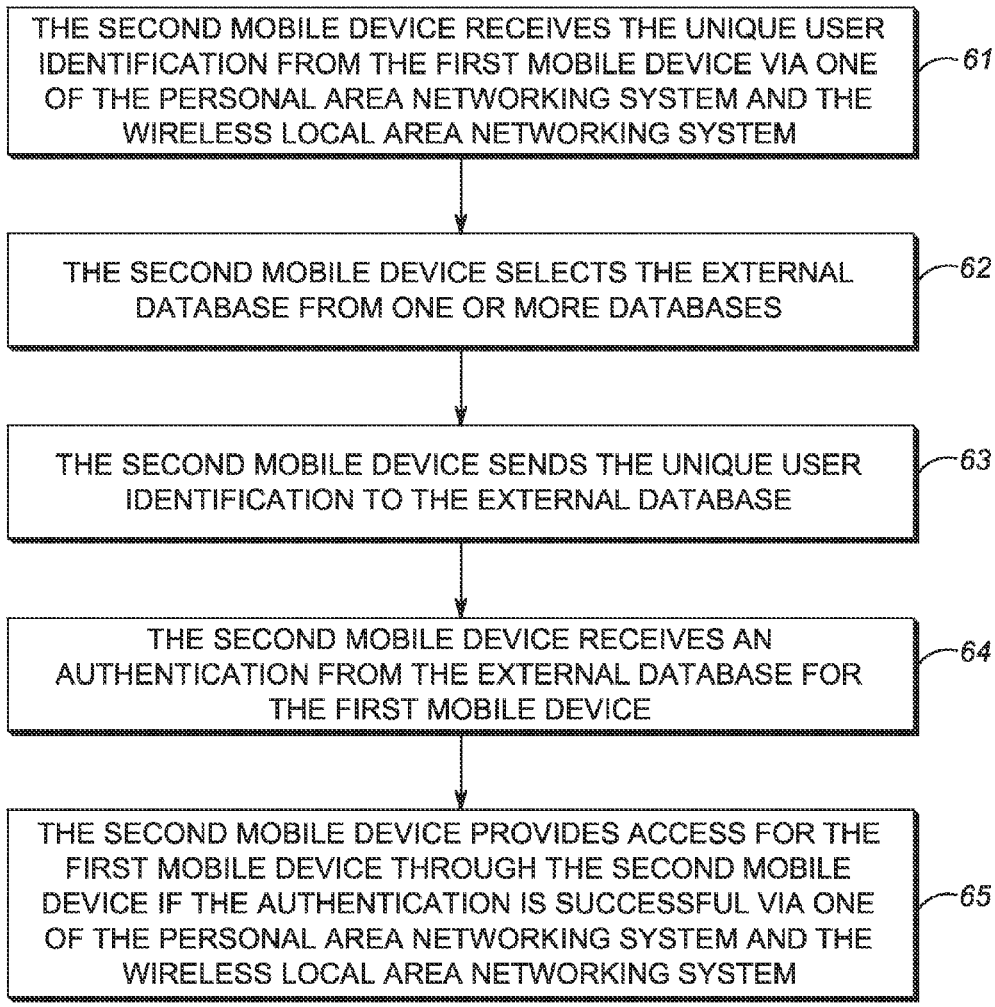
FIG. 6 is a flowchart of a mobile device authentication method in accordance with some embodiments.

Referring to FIG. 6, in an exemplary embodiment, a flowchart illustrates a mobile device authentication method 60. The method 60 can be implemented in the system 10, and the method 60 includes the first mobile device (e.g., the device 12A of FIGS. 1-2), the second mobile device (e.g., any of the devices 12B, 12C, 12D in FIGS. 1-2), and the external database. Generally, the method 60 enables the second device to collaborate at an incident with the first mobile device through use of the authentication/authorization of the user for the first mobile device, etc. The second mobile device receives the unique user identification from the first mobile device via one of the PAN or WLAN system (step 61). The second mobile device selects the external database from one or more databases (step 62). Note, as described herein, the second mobile device parses the unique user identification and determines therefrom which database to use. The second mobile device sends the unique user identification to the external database (step 63). Here, the second mobile device can perform a look up. For example, the unique user identification may identify the role and/or skill of the user for the first device. In step 63, the second mobile device is performing a verification that the user is who they say they are.

The second mobile device receives an authentication from the external database for the first mobile device (step 64). For example, the user could be a doctor, and the authentication can confirm that this is indeed a doctor that is on scene at the incident. Alternatively, the user could be a paramedic not on the public safety network, but carrying the broadband device 12A, and the authentication can confirm that the paramedic is indeed a paramedic needing access to the network. Of course, any scenario is contemplated herein with the generalized purpose of the method 60 being a confirmation that the user of the first device is indeed who they purport to be. The second mobile device provides access for the first mobile device through the second mobile device if the authentication is successful via one of the PAN or WLAN system (step 65). As described herein, the authentication can use multiple factors. For example, the unique user identification could properly identify the user (e.g., as a doctor, EMT, etc.), but the authentication could still fail if the user of the second mobile device overrides the access or if there is not enough bandwidth for the second mobile device.

Figure 7:
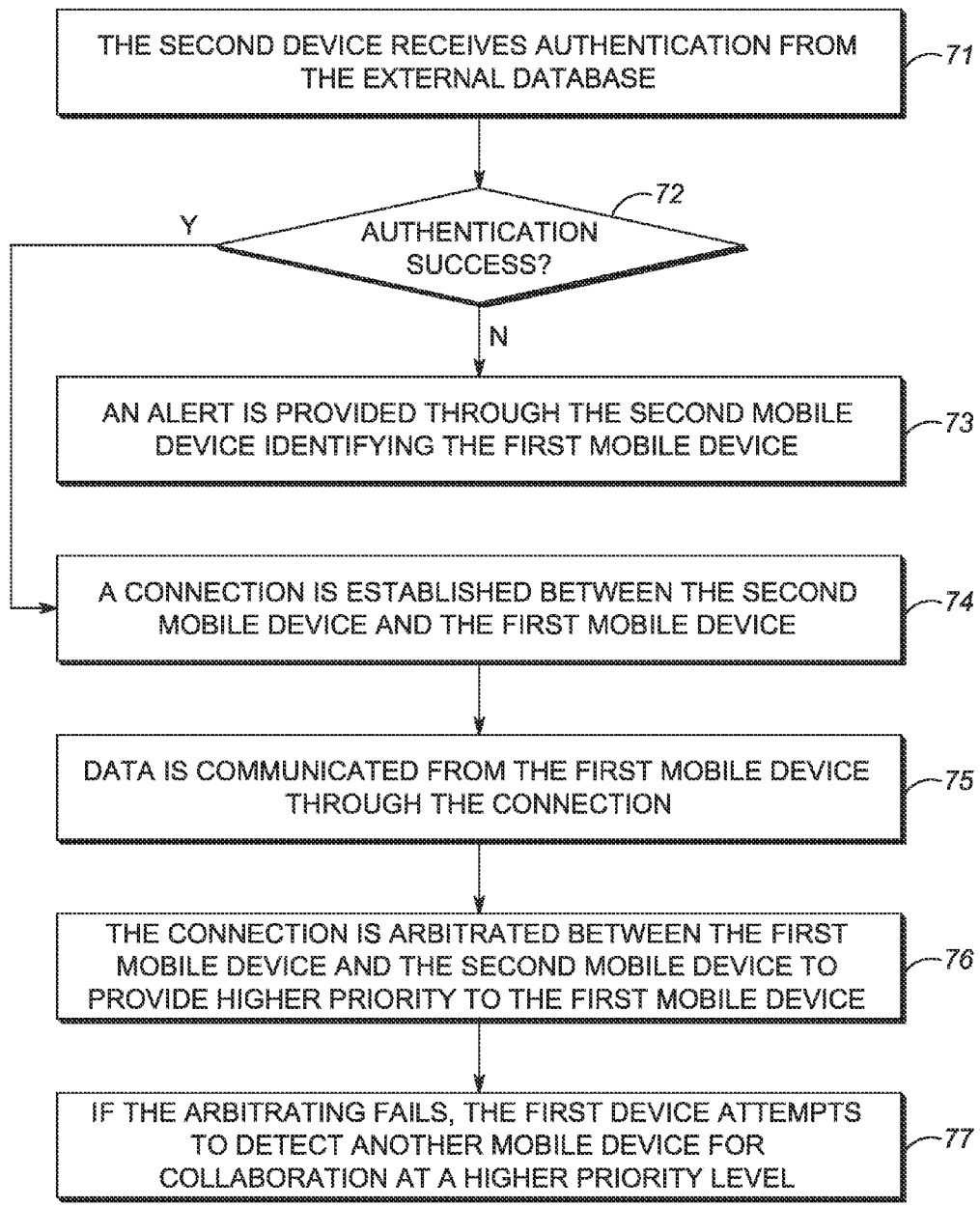
FIG. 7 is a flowchart of a post authentication method in accordance with some embodiments.

Referring to FIG. 7, in an exemplary embodiment, a flowchart illustrates a post authentication method 70. The method 70 can be implemented in the system 10, and the method 70 includes the first mobile device (e.g., the device 12A of FIGS. 1-2), the second mobile device (e.g., any of the devices 12B, 12C, 12D in FIGS. 1-2), and potentially other mobile devices. Generally, the method 70 enables the second device to collaborate at an incident with the first mobile device following the authentication/authorization. The second device receives authentication from the external database (step 71). If the authentication is not successful (step 72), an alert is provided through the second mobile device identifying the first mobile device. If the authentication is successful (step 72), a connection is established between the second mobile device and the first mobile device (step 74). The connection can be an ad hoc connection, a peer-to-peer connection, etc. via PAN, WLAN, etc. Data is communicated from the first mobile device through the connection (step 75).

The connection is arbitrated between the first mobile device and the second mobile device to provide higher priority to the first mobile device (step 76). For example, the first mobile device may need higher priority, more bandwidth, etc., and the first mobile device can be configured to communicate such a request to the second mobile device. If the arbitrating fails, the first device attempts to detect another mobile device for collaboration at a higher priority level (step 77). For example, the first mobile device can be the device 12A and the second mobile device can be the device 12B. The device 12A could continue to look for a more appropriate LMR device (i.e. different role/priority details or other attributes), e.g. the devices 12C, 12D. When the second mobile device recognizes a weak collaboration signal or when it is either turning off and shutting down due to power conservation (e.g., WiFi disabled) the second mobile device would inform the first mobile device.

Figure 8A:
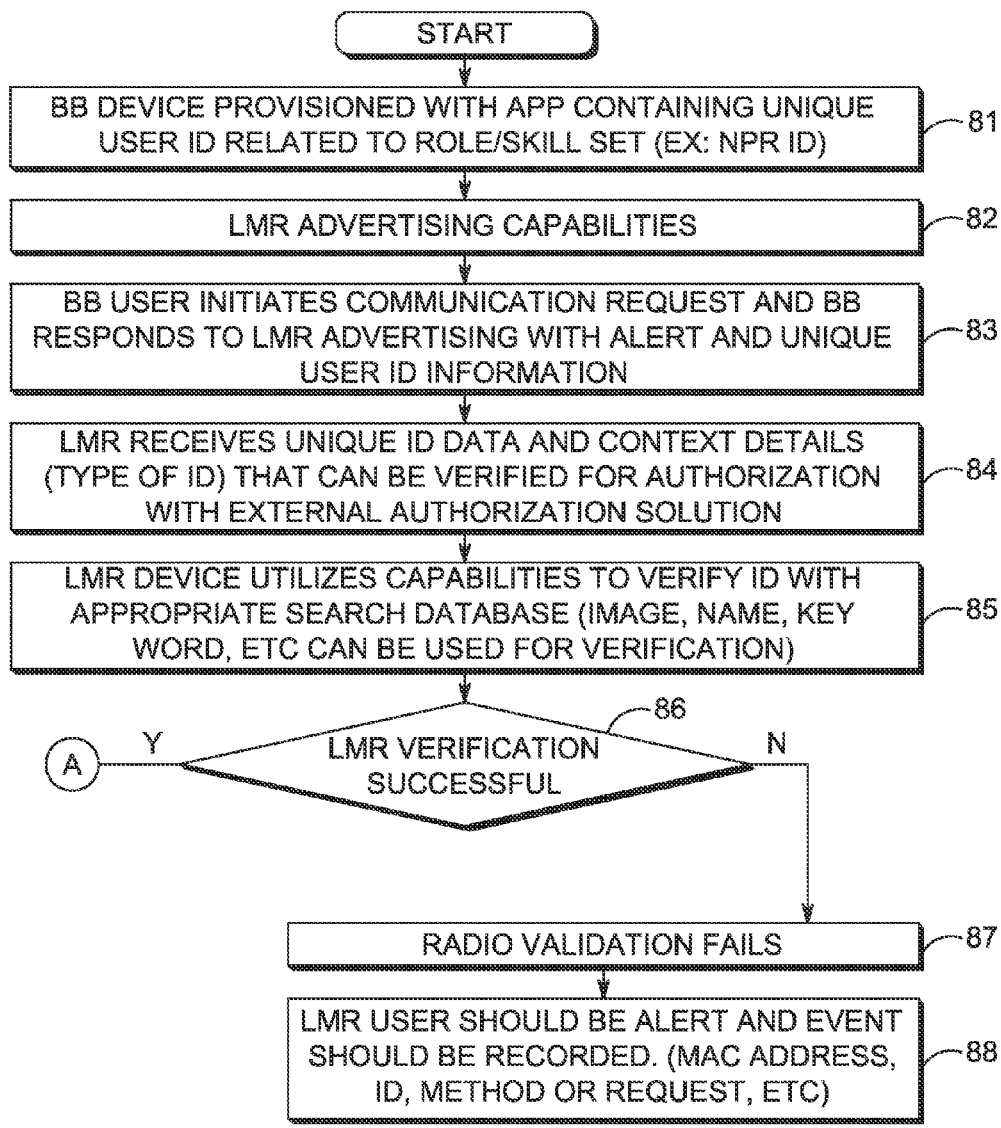
FIGS. 8A and 8B depict a flowchart of an exemplary collaboration method between a broadband (BB) device and an LMR device in accordance with some embodiments.
Figure 8B:
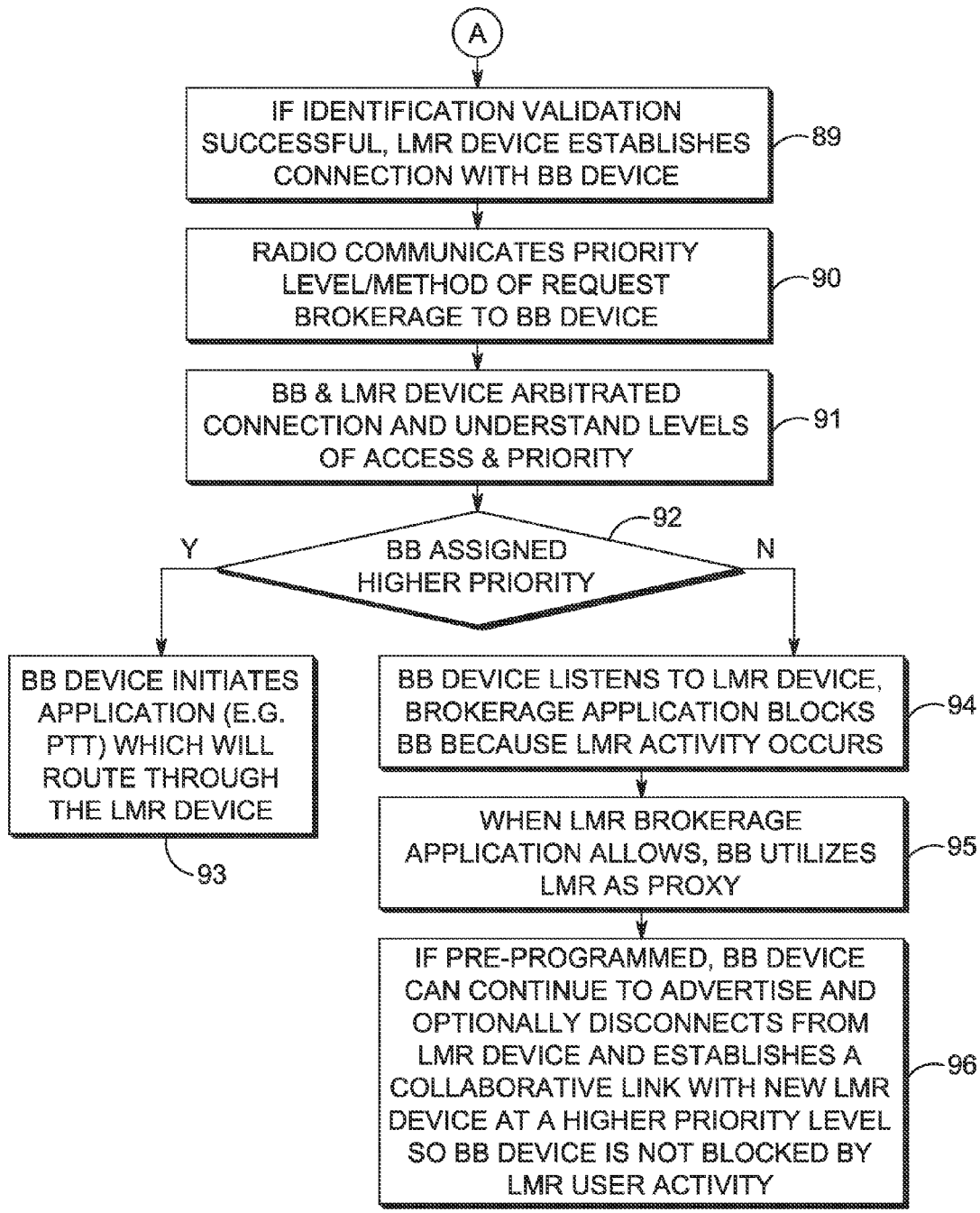

Referring to FIGS. 8A and 8B, in an exemplary embodiment, a flowchart illustrates an exemplary collaboration method 80 between a broadband (BB) device and an LMR device. A broadband device is provisioned with an application (app) containing a unique user identification related to the role/skill set of the user (step 81). At the scene of an incident, LMR device as advertising their capabilities (step 82). The broadband user via the broadband device initiates a communication request and the broadband user responds to the LMR device's advertising with an alert and unique user identification information (step 83). The LMR device receives the unique user identification information and context details (i.e., the type associated with the unique user identification) that can be verified for authorization with an external authorization solution (step 84). Specifically, the LMR device parses the alert and/or unique user identification information to obtain the context details. The context details can include what type of user is associated with the unique user identification, where the LMR device should authorize (i.e., which database), etc. In an exemplary embodiment, the external authorization solution can be the database 18. Also, the external authorization solution can include a two or more factor authentication for searching, so the LMR user may have to engage prior to identification. The external authorization solution can be a third-party external data source accessible by the LMR device and with a multi-factor authentication method.

The LMR device utilizes capabilities to verify the identification of the broadband device with an appropriate search database (step 85). For example, the LMR device can use images, name, key words, etc. for verification of the user of the broadband device. If the LMR verification is not successful (step 86), the radio validation fails (step 87) and the LMR user can receive an alert and an event could be recorded (step 88). For example, the MAC address, identification, method or request, etc. of the broadband device can be recorded. If the LMR verification is successful (step 87), the LMR device establishes a connection with the broadband device (step 89). The radio of the LMR device communicates priority level/method of request brokerage to the broadband device (step 90). The broadband device and the LMR device arbitrate the connection and each understands levels of access and priority (step 91).

If the broadband device needs to be assigned a higher priority level and the LMR device is able to provide (step 92), the broadband device can initiate an application (e.g., PTT) which will route through the LMR device (step 93). The application can request and receive the higher priority level. If the broadband device needs to be assigned a higher priority level and the LMR device is not able to provide (step 92), the broadband device listens to an LMR device, and a brokerage application blocks the broadband device because LMR activity is occurring (step 94). When the brokerage application allows, the broadband device can use the LMR device as a proxy (step 95). If pre-programmed, the broadband device can continue to advertise and optionally disconnect from the LMR device and establish a collaborative link with a new LMR device at a higher priority level so the broadband device is not blocked by LMR user activity (step 96).

Figure 9:
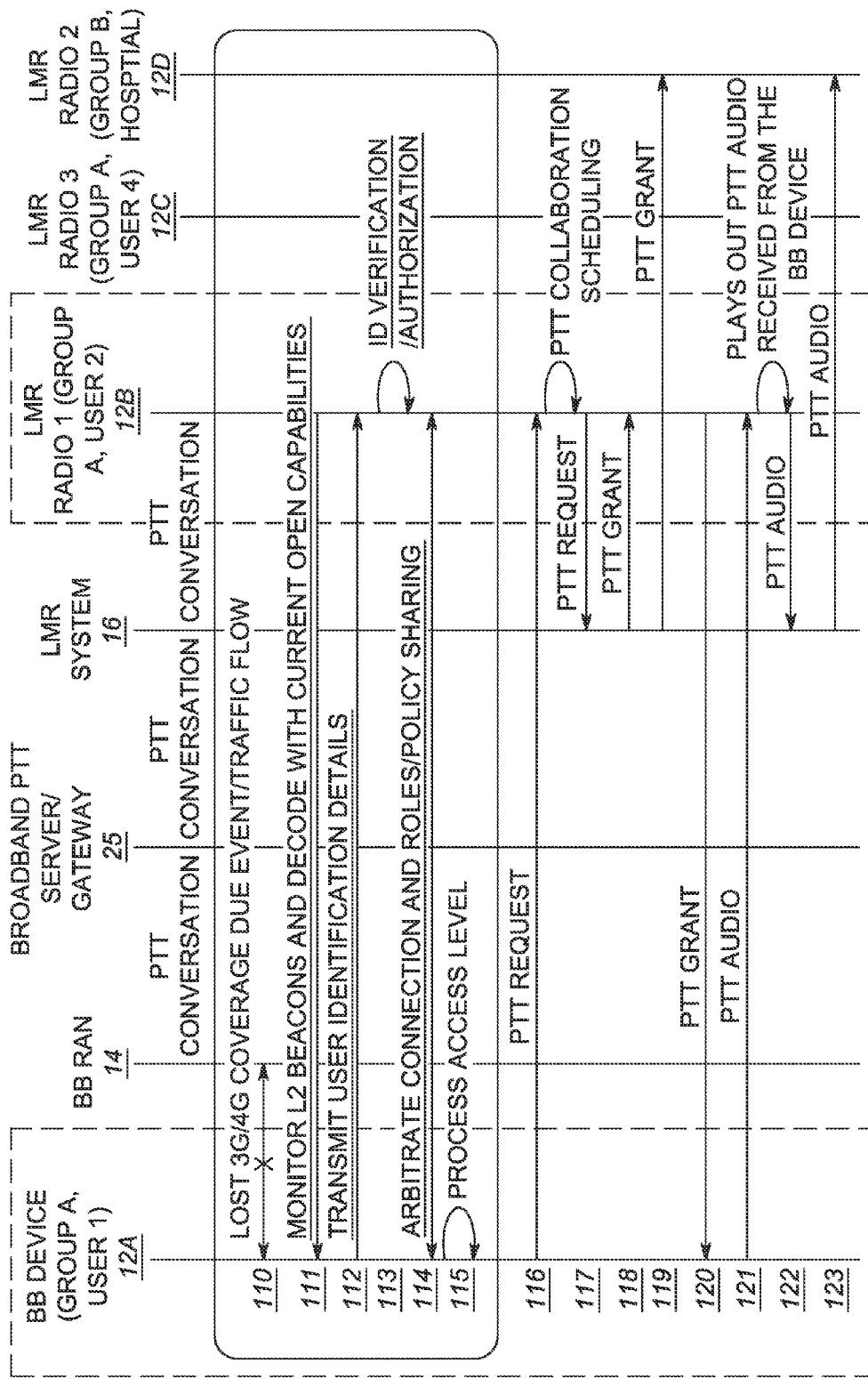
FIG. 9 is a flow diagram of an exemplary collaboration operation on the system of FIGS. 1-2 in accordance with some embodiments.

Referring to FIG. 9, in an exemplary embodiment, a flow diagram illustrates an exemplary collaboration operation on the system 10. In particular, the operation is illustrated with the device 12A being a broadband device and the network 14 is a broadband radio access network (RAN). The devices 12B, 12C, 12D are LMR devices and the network 16 is an LMR system. Further, the operation includes PTT as an exemplary application with a broadband PTT server/gateway 25 communicatively coupled to the devices 12A, 12B, 12C, 12D such as through the networks 14, 16. The flow diagram is shown from steps 110-122 in order showing activities between the various devices. First the broadband device loses coverage (step 110). For example, the broadband device could lose 3G/4G coverage due to an event or traffic flow. The broadband device monitors layer 2 beacons and decodes any for current open capabilities (step 111). Here, the broadband device detects the device 12B. In response, the broadband device transmits its user identification details to the device 12B (step 112).

The device 12B receives the user identification details and performs authentication/authorization/verification (step 113). Here, the device 12B can communicate the user identification details to the appropriate database for verification. Upon successful verification, the devices can arbitrate a connection and roles/policy sharing there between (step 114). The device 12A processes the arbitrated access level and configured itself for the connection (step 115). With the connection established, the device 12A can operate an application such as providing a PTT request through the connection (step 116). The device 12B receives the PTT request and performs collaboration scheduling and sends the PTT request through the LMR system (step 117). The LMR system returns a PTT grant to the device 12B (step 118). The LMR system also sends a PTT grant to the device 12D (which is the end device in the PTT request) (step 119). The device 12B provides the PTT grant to the device 12A (step 120). Now, the device 12A can provide PTT audio through the device 12B (step 121). The device 12B provides the PTT audio to the LMR system (step 122) which provides the PTT audio to the device 12D (step 123). In an exemplary embodiment, the operation could allow a doctor on scene to communicate directly with a hospital to coordinate an emergency response.

Figure 10:
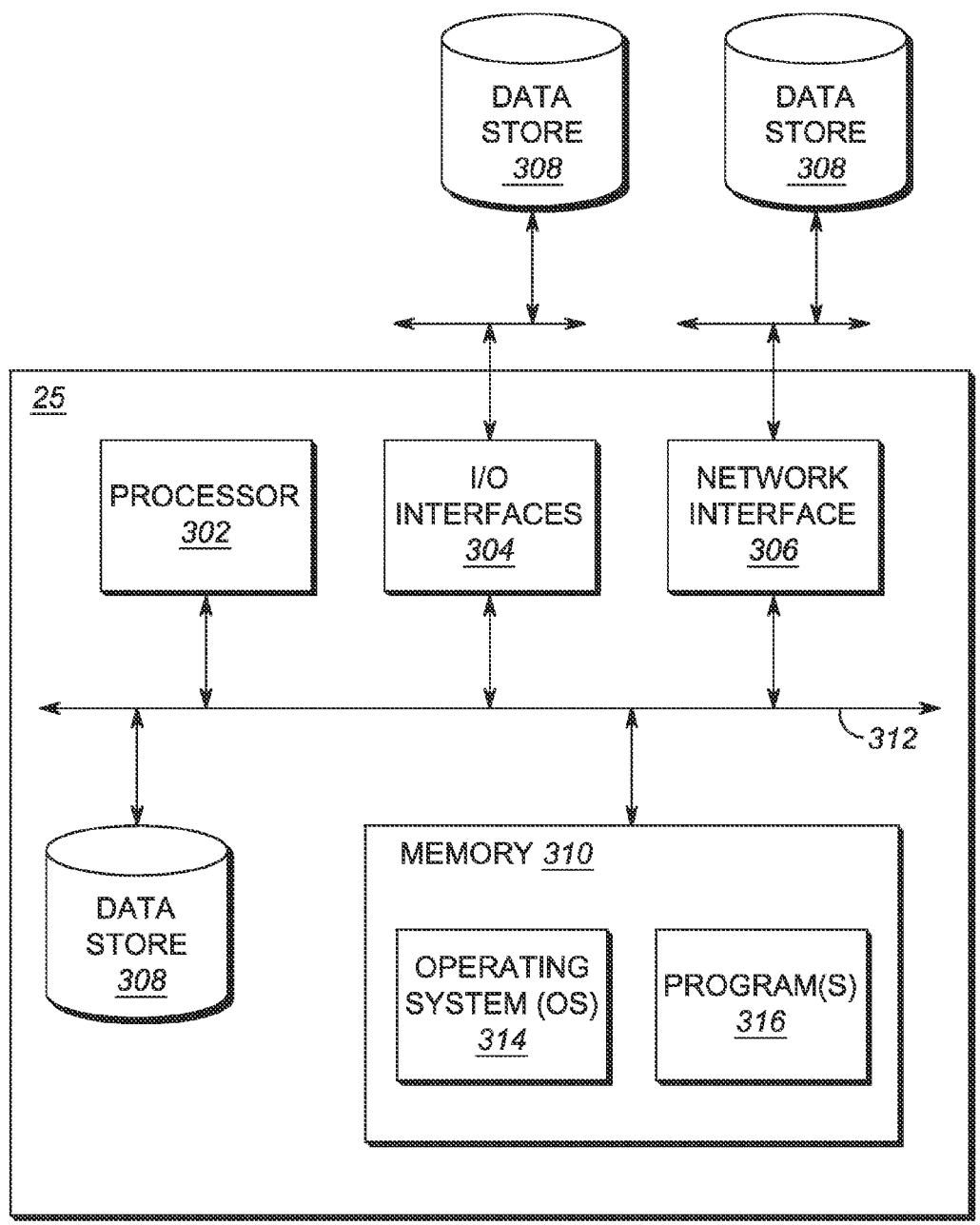
FIG. 10 is a block diagram of a server in accordance with some embodiments.

Referring to FIG. 10, in an exemplary embodiment, a block diagram illustrates a server 25 for the system 10, the operation, and the like. The server 25 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 10 depicts the server 25 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 25, a semiconductor-based microprocessor (in the form of a microchip or chip set), or generally any device for executing software instructions. When the server 5 is in operation, the processor 302 is configured to execute software stored within the memory 310, to communicate data to and from the memory 310, and to generally control operations of the server 25 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 can be used to enable the server 25 to communicate on a network, such as the network 16. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 25 such as, for example, an internal hard drive connected to the local interface 312 in the server 25. Additionally in another embodiment, the data store 308 can be located external to the server 25 such as, for example, an external hard drive connected to the I/O interfaces 304 (e.g., SCSI or USB connection). In a further embodiment, the data store 308 can be connected to the server 25 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The software in memory 310 can include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein. For example, the programs 316 can be configured to enable the methods described herein.

Figure 11:
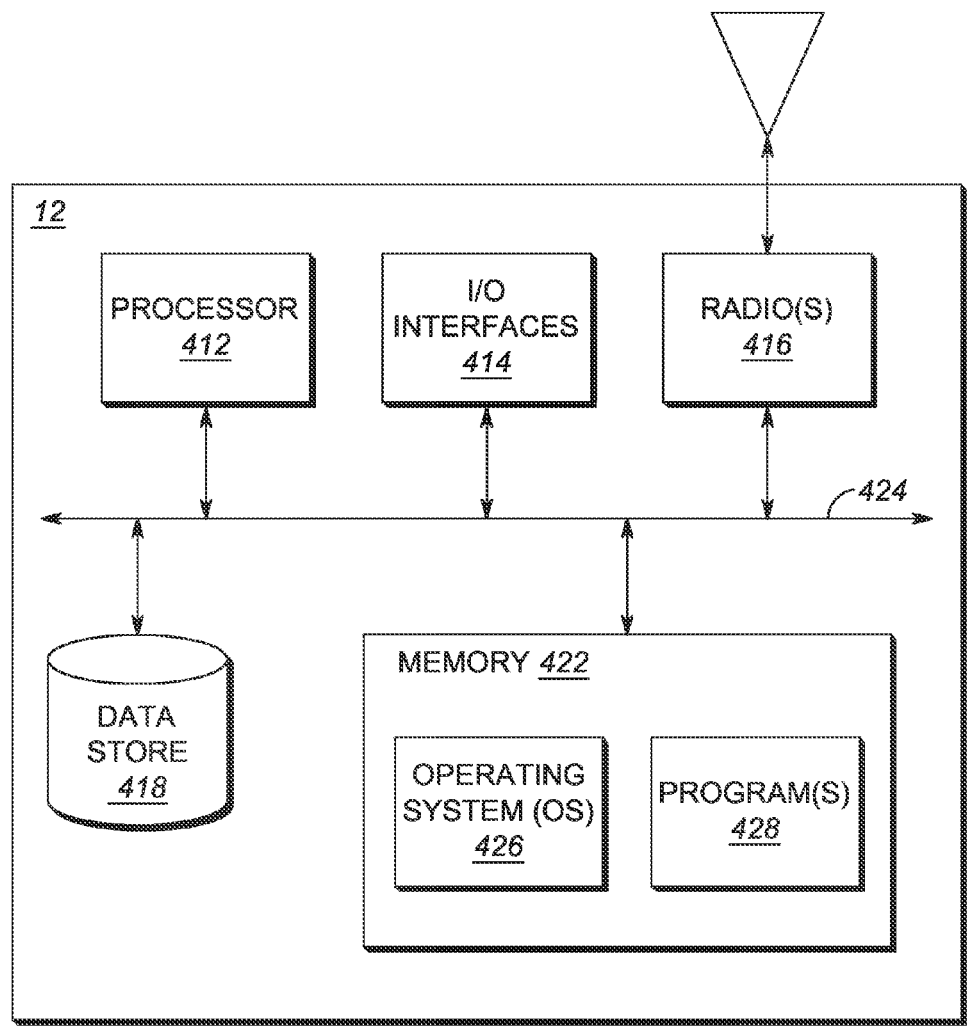
FIG. 11 is a block diagram of a mobile device in accordance with some embodiments.

Referring to FIG. 11, in an exemplary embodiment, a block diagram illustrates a mobile device 12 for use in a wireless collaboration system and method. The mobile device 12 can be a digital device that, in terms of hardware architecture, generally includes a processor 412, input/output (I/O) interfaces 414, a radio 416, a data store 418, and memory 422. It should be appreciated by those of ordinary skill in the art that FIG. 11 depicts the mobile device 12 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the mobile device 12, a semiconductor-based microprocessor (in the form of a microchip or chip set), or generally any device for executing software instructions. When the mobile device 12 is in operation, the processor 412 is configured to execute software stored within the memory 422, to communicate data to and from the memory 422, and to generally control operations of the mobile device 12 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 12. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 11, the software in the memory system 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the mobile device 12. For example, exemplary programs 428 can include, but not limited to, a web browser, social networking applications, streaming media applications, games, mapping and location applications, electronic mail applications, financial applications, and the like.

The devices 12A, 12B, 12C, 12D can each be similar to the device 12 of FIG. 11. Of course, the radio 416 and other components include differing configurations for different access technologies (e.g., 3G/4G vs. LMR). Also, the devices 12A, 12B, 12C, 12D can include multiple radios. For example, the device 12A could include a radio for access to the broadband network 16 and a radio for WiFi or other PAN technologies. The devices 12B, 12C, 12D could include a radio for access to the LMR system and a radio for WiFi, etc. The programs 428 can also include functionality for each of the devices 12A, 12B, 12C, 12D to implement the methods described herein. In an exemplary embodiment, the second device or the devices 12B, 12C, 12D could include user interface enhancements which show currently paired devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device collaboration system, comprising:
a first mobile device utilizing a first wireless network;
a second mobile device utilizing a second wireless network;
an external database communicatively coupled to the second mobile device;
wherein the first mobile device comprises software comprising instructions executable by the first mobile device and, in response to such execution, cause the first mobile device to:
store unique user identification related to a role and skill set of an associated user of the first mobile device;
detect the second mobile device responsive to an inability to connect to the first wireless network;
communicate the unique user identification to the second mobile device; and
establish a collaborative connection with the second mobile device responsive to the second mobile device successfully verifying the first mobile device using the unique user identification and the external database.

2. The mobile device collaboration system of claim 1, wherein the second mobile device comprises software comprising instructions executable by the second mobile device and, in response to such execution, cause the second mobile device to:
advertise availability for collaboration using beacons;
receive the unique user identification from the first mobile device;
communicate the unique user identification to the external database;
establish the collaborative connection with the first mobile device responsive to the successfully verifying the first mobile device using the unique user identification and the external database.

3. The mobile device collaboration system of claim 2, wherein the software comprising instructions executable by the second mobile device and, in response to such execution, further causes the second mobile device to:
set the beacons to be advertised continuously or in response to a request from the first mobile device or a location server.

4. The mobile device collaboration system of claim 1, wherein the software comprising instructions executable by the second mobile device and, in response to such execution, further causes the second mobile device to:
send additional beacons requesting roles and skills of available users in range of the second mobile device, wherein the roles and skills of available users are determined by receiving user identification for each of the available users and communicating the user identification to the external database.

5. A mobile device, comprising:
a first radio configured to operate on a broadband wireless network;
a second radio configured to operate on a personal area network;
a processor communicatively coupled to the first radio and the second radio; and
software stored in memory and comprising instructions executable by the processor and, in response to such execution, cause the processor to:
store unique user identification related to a role and skill set of an associated user of the mobile device at the mobile device;
detect a second mobile device responsive to an inability to connect to the broadband wireless network, wherein the second mobile device is communicatively coupled to an external database and operates on a different network than the mobile device;
communicate the unique user identification to the second mobile device; and
establish a collaborative connection with the second mobile device responsive to the second mobile device successfully verifying the mobile device using the unique user identification and the external database.

6. A method for authenticating mobile devices at an incident via collaboration, the method comprising:
storing unique user identification related to a role and skill set of an associated user of a first mobile device at the first mobile device, wherein the first mobile device utilizes a first wireless network;
detecting a second mobile device responsive to an inability of the first mobile device to connect to a broadband wireless network, wherein the second mobile device is communicatively coupled to an external database and utilizes a different network than the first mobile device;
communicating by the first mobile device the unique user identification to the second mobile device; and
establishing a collaborative connection between the first mobile device and the second mobile device responsive to the second mobile device successfully verifying the first mobile device using the unique user identification and the external database.

* * * * *

UNITED STATES PATENT AND TRADEMARK OFFICE
CERTIFICATE OF CORRECTION

PATENT NO. : 9,094,827 B1  
APPLICATION NO. : 14/602595  
DATED : July 28, 2015  
INVENTOR(S) : David E. Klein et al.

It is certified that error appears in the above-identified patent and that said Letters Patent is hereby corrected as shown below:

IN THE TITLE PAGE:

In Item (71), under "Applicant," in Column 1, Line 1, delete "INC," and insert -- INC., --, therefor.

IN THE SPECIFICATION:

In Column 1, Line 11, delete "the" and insert -- now Pat. No. 8,971,850, the --, therefor.

In Column 7, Line 16, delete "with a" and insert -- with an --, therefor.

Signed and Sealed this  
Twenty-first Day of June, 2016

Michelle K. Lee  
*Director of the United States Patent and Trademark Office*